United States Patent [19]

Cooper

[11] Patent Number: 5,386,455
[45] Date of Patent: Jan. 31, 1995

[54] SYSTEM AND METHOD FOR AUTOMATIC ACTIVATION OF CELLULAR TELEPHONES

[75] Inventor: Gershon N. Cooper, Encino, Calif.

[73] Assignee: Alliance Research Corporation, Chatsworth, Calif.

[21] Appl. No.: 177,275

[22] Filed: Jan. 4, 1994

[51] Int. Cl.⁶ .............................................. H04M 11/00
[52] U.S. Cl. .......................................... 379/58; 379/59
[58] Field of Search ...................... 379/58, 59, 63, 91; 455/33.1

[56] References Cited

U.S. PATENT DOCUMENTS

| | | | |
|---|---|---|---|
| 4,958,368 | 9/1990 | Parker | 379/58 X |
| 5,297,191 | 3/1994 | Gerzberg | 379/59 |
| 5,297,192 | 3/1994 | Gerzberg | 379/59 |
| 5,315,638 | 5/1994 | Mukari | 379/58 |

*Primary Examiner*—Curtis Kuntz
*Assistant Examiner*—G. J. Oehling
*Attorney, Agent, or Firm*—Matthew F. Jodziewicz

[57] ABSTRACT

A system and method for the automatic remote activation of the cellular telephone with the carrier, includes a central processing unit containing and operating in accord with a control program. The central processing unit has, in a memory, a plurality of hardware and firmware drivers having, respectively, the operating circuitry and commands necessary for controlling a selected cellular telephone. The control program operates to select a desired one pair of hardware and firmware drivers for activation programming of the cellular telephone. An input device is connected to the central processing unit, for manually entering data thereinto. A cable connects the central processing unit to the Input-/Output data interface bus port of the cellular telephone unit for transferring data therebetween. A modem connects the central processing unit with the authorizing computer of the selected carrier for transferring data therebetween. The control program is adapted to transfer data received manually from the input device and from the cellular telephone to the authorizing computer of the selected carrier, and for receiving data from the authorizing computer of the selected carrier and transferring the received data to the cellular telephone in accord with the selected pair of hardware and firmware drivers for activation programming of the cellular telephone.

3 Claims, 3 Drawing Sheets

SYSTEM AND METHOD FOR AUTOMATIC ACTIVATION OF CELLULAR TELEPHONES

NOTICE REGARDING COPYRIGHTED MATERIAL

A portion of the disclosure of this patent document contains materials which are subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. General and Particular Scope of the Invention

The present invention relates in general to a data transmission system and a method which can be used to interface a cellular telephone with the activation computer of a selected carrier for the programming of a cellular telephone for activation on a carrier.

2. Known Prior Art

Cellular telephone use in the United States has dramatically increased over the past few years. When cellular telephones were first introduced in 1983, they were mainly large, vehicle installed units. The units were sold through specialty dealers and small shops specializing in the installation and activation of cellular telephones.

In recent years, the size of the cellular telephone units have shrunk, and portable and handheld units have become commonplace. Mass retailers have replaced the specialty dealers and the former distribution and installation systems. The mass retailer concentrates on selling the consumer a cellular telephone and prefers to spend less time installing or "activating" the purchased cellular telephones, as their time can be spent elsewhere at a greater profit.

Currently, the activation process of a cellular telephone occurs as follows: The cellular telephone unit arrives at the retailer's store from the factory without the information necessary for its activation, since the cellular telephone units are being sold in areas serviced local carriers having different and sometimes conflicting activation requirements. One such area and carrier specific requirement is generally a telephone number (Mobile Identification Number MIN) installed in the memory of the cellular telephone which is assigned by a local telephone carrier company and must be programmed after purchase and authorization by the local carrier into the cellular telephone in order to activate it.

The local carrier also requires some information from the cellular telephone unit itself that identifies the particular cellular unit to the local carrier's equipment in order to effect the right service (protocol selection specific to the manufacturer of the cellular unit) and correct billing (call cost accounting).

The complete process of exchanging this required information that will enable the cellular telephone to operate with its selected local carrier is called activation.

Currently activation is a long process starting with a sale of the cellular telephone by the retailer. The buyer then fills out an application for service on a form supplied by the selected local carrier. The application requests, in addition to identifying subscriber (buyer) information, some information about the particular cellular telephone for the local carrier's information, e.g., the manufacturer of the particular unit, its required protocol, its electronic serial number (ESN). Once the application is completed, the retailer then sends the application to the selected local carrier where it is reviewed for credit worthiness. If approved, the cellular telephone information is entered into the local carrier's equipment and the carrier issues the MIN that works in conjunction with the particular cellular telephone to identify and grant access to the local carrier's system. The carrier then notifies the retailer of the assigned MIN. Now it is the responsibility of the retailer to "program" the MIN and any other necessary information into the cellular telephone unit to complete the activation process.

In a majority of the cases, this final programming of the cellular telephone unit is manually done by the retailer's technician or even sales clerk, with the aid of a manual through the dial key pad of the cellular telephone. A correct sequence of numbers and codes must be entered in order to program the cellular telephone. A small mistake can cause a failure of service, render the cellular unit inoperable or even damage it. In spite of the need for accuracy and knowledge in performing this activation process, many of the individuals charged with performing this activation are either untrained or unfamiliar with the proper process due to either lack of interest or the need to continue selling on commission and not engage in such unproductive work. Currently, approximately 30% of the post-sale activation programming fails, causing the consumer to return to the place of purchase for reprogramming with not only unit down-time, but the inconvenience of having to return and spend time while the unit is once again programmed.

The present invention not only greatly reduces the time required for programming or for activation, but it insures a correct exchange of activation programming information by automating the process, thus eliminating programming errors.

Most cellular telephones have an Input/Output data interface port or bus for accessing their central processing units. The central processing unit of the cellular telephone processes all the information contained in the various parts of the cellular telephone and directs them to different destinations as required for the operation of the cellular telephone. The communication is done according to a certain proprietary "protocol." Knowing this protocol and using a separate central processing unit, one can read information stored in the cellular telephone and store other information as needed.

This invention includes a central processing unit having a read only memory and a random access memory containing and operating in accord with a data program. A bus connector and other components The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENT OF THE INVENTION

Figure 1:
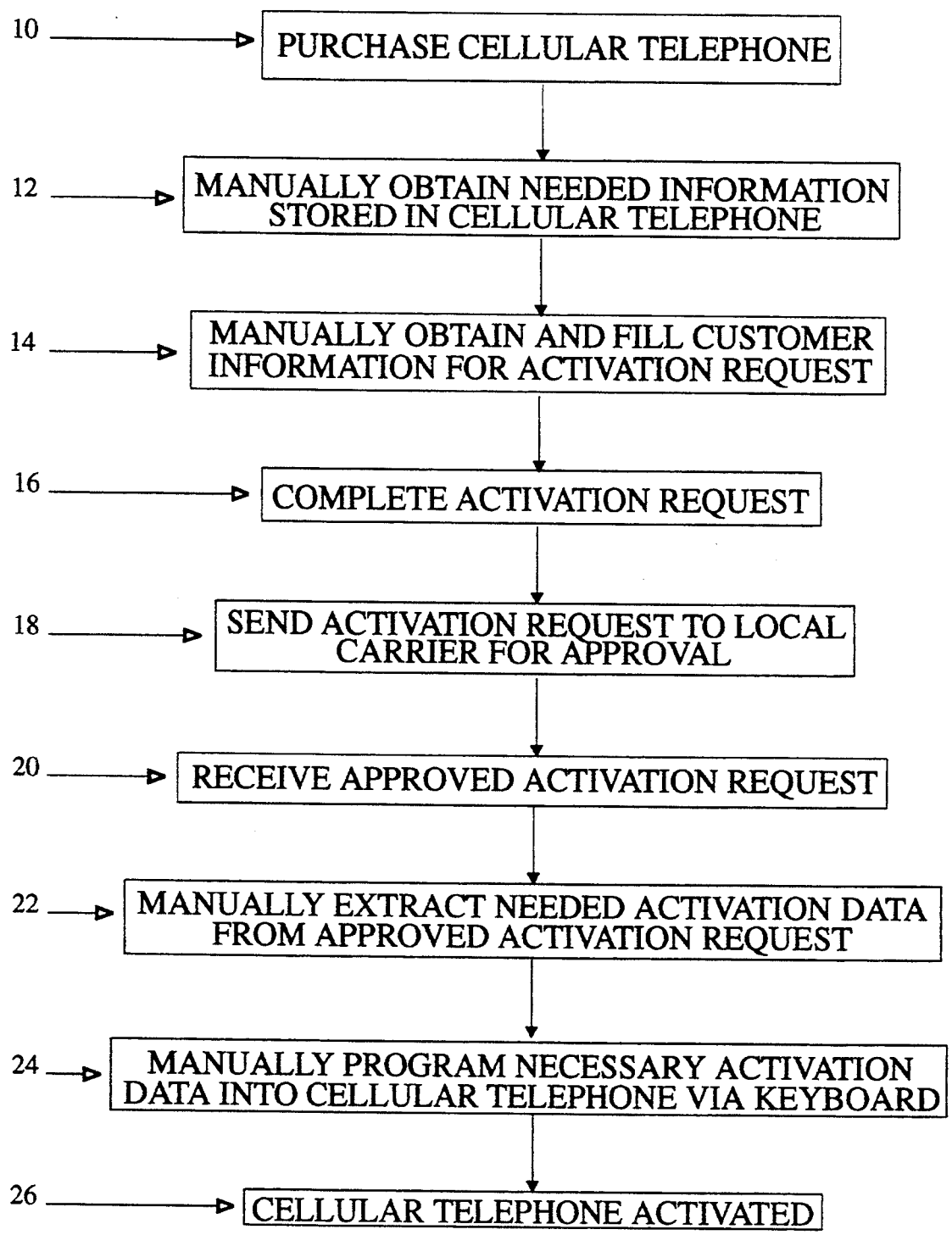
FIG. 1 is a block diagram of the existing activation method for a cellular telephone unit with a local carrier.
Figure 2:
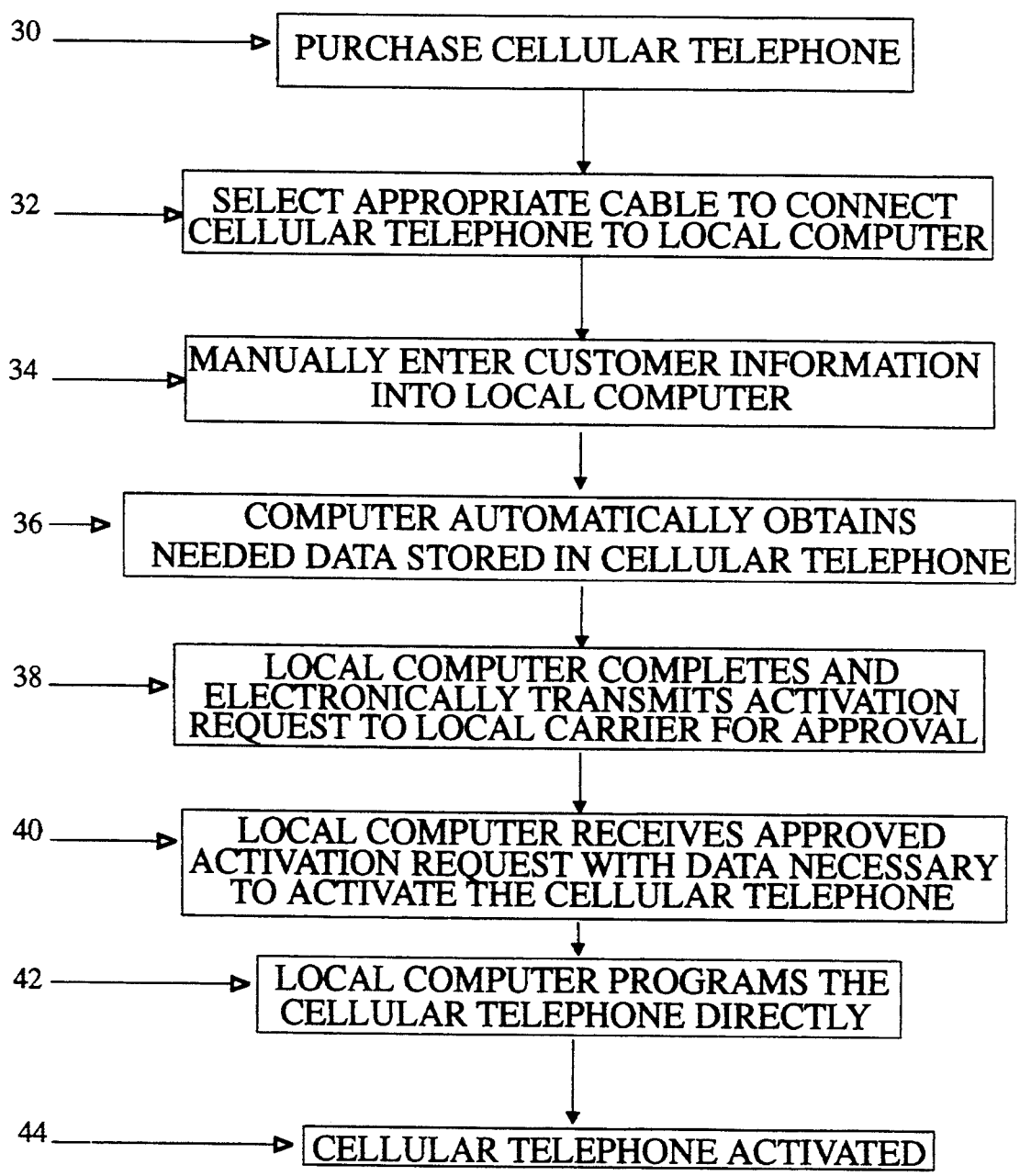
FIG. 2 is a block diagram of a method embodying the present invention for activating a cellular telephone unit with a local carrier.
Figure 3:
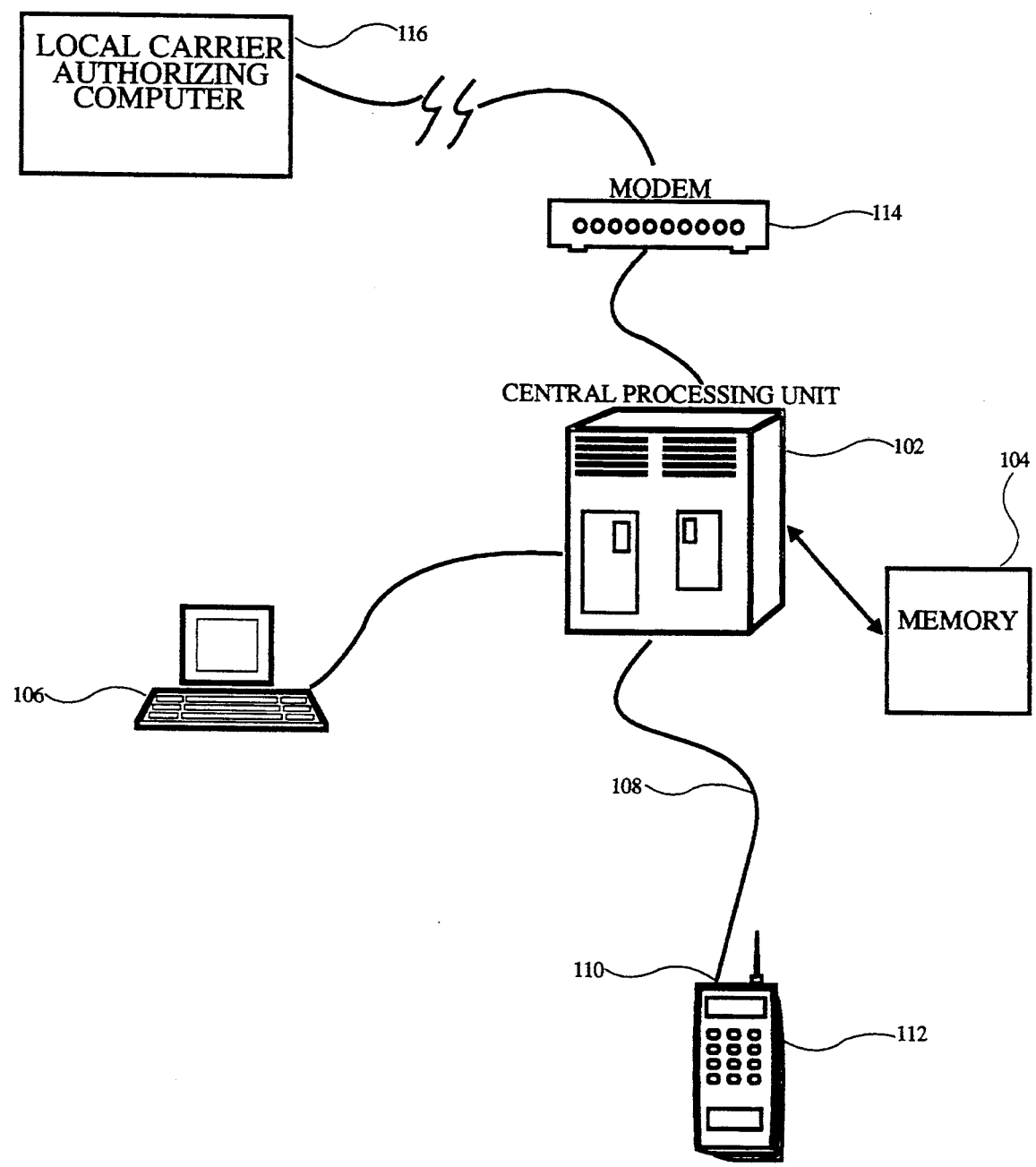
FIG. 3 is a block diagram of a system embodying the present invention showing the operating component blocks of such a system.

With reference to the accompanying drawings in FIGS. 1 to 3, a preferred embodiment of the invention in both a method and a system is now described.

FIG. 1 shows the current method for activating a cellular telephone unit with a local carrier.

As stated above, when the customer purchases a cellular telephone, the cellular telephone unit arrives at the retailer's store from the factory without the information necessary for its activation. This is because the cellular telephone units are being sold in areas serviced by local carriers having different and sometimes conflicting activation requirements. One such area and carrier specific requirement is generally a telephone number (Mobile Identification Number MIN) installed in the memory of the cellular telephone which is assigned by a local telephone carrier company and must be programmed after purchase and authorization by the local carrier into the cellular telephone in order to activate it.

The local carrier also requires some information from the cellular telephone unit itself that identifies the particular cellular unit to the local carrier's equipment in order to effect the right service (protocol selection specific to the manufacturer of the cellular unit) and correct billing (call cost accounting).

Referring to FIG. 1, current activation is a long process starting with a sale 10 of the cellular telephone by the retailer.

The buyer then manually fills out an application for service on a form supplied by the selected local carrier 16. The application requests, in addition to identifying subscriber (buyer) information 14, some information about the particular cellular telephone for the local carrier's information 12, e.g., the manufacturer of the particular unit, its required protocol, its electronic serial number (ESN).

Once the application is completed, the retailer then sends the application to the selected local carrier 18 where it is reviewed for credit worthiness. If approved, the cellular telephone information is entered into the local carrier's equipment and the carrier issues the MIN that works in conjunction with the particular cellular telephone to identify and grant access to the local carrier's system. The carrier then notifies the retailer of the assigned MIN and other approval/activation data 20.

Now it is the responsibility of the retailer to extract manually the approved MIN and other activation data 22 and manually "program" the MIN and any other necessary information into the cellular telephone unit to complete the activation process 24 before the cellular telephone unit is activated 26.

In a majority of the cases, this final programming of the cellular telephone unit is manually done by the retailer's technician or even sales clerk, with the aid of a manual through the dial key pad of the cellular telephone. A correct sequence of numbers and codes must be entered in order to program the cellular telephone. A small mistake can cause a failure of service, render the cellular unit inoperable or even damage it. In spite of the need for accuracy and knowledge in performing this activation process, many of the individuals charged with performing this activation are either untrained or unfamiliar with the proper process due to either lack of interest or the need to continue selling on commission and not engage in such unproductive work. Currently, approximately 30% of the post-sale activation programming fails, causing the consumer to return to the place of purchase for reprogramming with not only unit down-time, but the inconvenience of having to return and spend time while the unit is once again programmed.

FIG. 2 illustrates a method embodying the present invention for interacting with the activating computer of a local cellular telephone carrier and a cellular telephone unit, for the automatic remote activation of the cellular telephone with the carrier. The preferred method of the present invention comprises the following steps.

The process starts as the current method with a sale 30 of the cellular telephone by the retailer.

The purchased cellular telephone is then connected by an appropriate cable to a local computer, such as a microcomputer or microprocessor, for activation processing and programming 32. Preferably the cable connects the local computer to the Input/Output data interface bus port of the cellular telephone unit for transferring data therebetween.

The local computer contains and operates in accord with a control program. It further has in its memory, a plurality of hardware and firmware drivers having, respectively, the operating circuitry and commands necessary for controlling a selected cellular telephone. The control program operates to select a desired one pair of hardware and firmware drivers for activation programming of the cellular telephone.

The buyer information required by the application for service by the selected local carrier is then manually entered in the local computer 34.

Likewise, the local computer, operating under its control program automatically interrogates the cellular telephone unit through the connecting cable for the data stored in the cellular telephone unit 36.

Once all the needed data is collected, the local computer creates an activation request containing the data specified by the local carrier as being necessary to activate a cellular telephone and transfers the activation request to the authorizing computer of the selected carrier for processing 38.

Once the activation request is approved by the local carrier, the local computer receives directly from the authorizing computer of the selected carrier, the data that must be programmed into the cellular telephone unit for its activation on the carrier 40.

The local computer, under operation of its control program, then transfers the data received from the authorizing computer of the selected carrier that must be programmed into the cellular telephone unit for its activation, directly into the cellular telephone via the connecting cable 42, thereby activating the cellular telephone 44.

FIG. 3 illustrates a system embodying the present invention that interacts with the activating computer of a local cellular telephone carrier and a cellular telephone unit, for the automatic remote activation of the cellular telephone with the carrier. The system, generally referred to by reference arrow 100 comprises a microprocessor 102 containing and operating in accord with an internally stored control program. The microprocessor 102 further has in a memory 104, a plurality of hardware and firmware drivers having, respectively, the operating circuitry and commands necessary for controlling a selected cellular telephone. The control program operates to select a desired one pair of hardware and firmware drivers for activation programming of the cellular telephone. Memory 104 can be either internal or external and either Read-Only-Memory or Random-Access-Memory.

An input device 106, such as a keyboard, is connected to the microprocessor 102, for manually entering data thereinto.

A cable 108 connects the microprocessor 102 to the Input/Output data interface bus port 110 of the cellular telephone unit 112 for transferring data therebetween.

A modem device 114 preferably connects microprocessor 102 with the authorizing computer 116 of the selected local carrier for transferring data therebetween.

The control program in microprocessor 102 is adapted to transfer data received manually from input device 106 and from the cellular telephone 112 to the authorizing computer 116 of the selected carrier, and for receiving data from the authorizing computer 116 of the selected carrier and transferring the received data to the cellular telephone 112 in accord with the selected pair of hardware and firmware drivers for activation programming of the cellular telephone 112.

Cable 108 may include a plurality of cables, each one of which having a connector on one end adapted to connect with the Input/Output data interface bus port of a specific type of cellular telephone unit for transferring data therebetween so that the system can accommodate the different types of cellular telephone units made by various manufacturers.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A system, interacting with an activating computer of a local cellular telephone carrier and a cellular telephone unit, for the automatic remote activation of the cellular telephone with the carrier, comprising:
   a central processing unit containing and operating in accord with a control program, said central processing unit further having in a memory means, a plurality of hardware and firmware drivers having, respectively, the operating circuitry and commands necessary for controlling a selected cellular telephone, said control program operating to select a desired one pair of said hardware and firmware drivers for activation programming of the cellular telephone;
   input means connected to said central processing unit, for manually entering data thereinto;
   cable means connecting said central processing unit to the Input/Output data interface bus port of the cellular telephone unit for transferring data therebetween;
   modem means connecting said central processing unit with the activating computer of the selected carrier for transferring data therebetween,
   said control program in said central processing unit transfers data received manually from said input means and from the cellular telephone to the activating computer of the selected carrier, and for receiving data from the activating computer of the selected carrier and transferring the received data to the cellular telephone in accord with said selected pair of said hardware and firmware drivers for activation programming of the cellular telephone.

2. A system as in claim 1 wherein said cable means includes a plurality of cables, each one of said plurality of cables having a connector on one end connecting with the Input/Output data interface bus port of a specific type of cellular telephone unit for transferring data therebetween.

3. A method for interacting with an activating computer of a local cellular telephone carrier and a cellular telephone unit, for the automatic remote activation of the cellular telephone with the carrier, comprising the steps of:
   connecting the cellular telephone unit to be activated with a central processing unit containing and operating in accord with a control program, said central processing unit further having in a memory means, a plurality of hardware and firmware drivers having, respectively, the operating circuitry and commands necessary for controlling a selected cellular telephone, said control program operating to select a desired one pair of said hardware and firmware drivers for activation programming of the cellular telephone;
   connecting said central processing unit to the Input/Output data interface bus port of the cellular telephone unit for transferring data therebetween;
   creating an activation request containing the data specified by the local carrier as being necessary to activate a cellular telephone by manually entering the purchaser data required by activating computer of the local cellular telephone carrier and by using the control program to automatically obtain, directly from the cellular telephone, the required cellular telephone data required by the activating computer of the local cellular telephone carrier;
   transferring said activation request to the activating computer of the selected carrier for processing;
   receiving, from the activating computer of the selected carrier, the data that must be programmed into the cellular telephone unit for its activation on the carrier;
   transferring the data received from the activating computer of the selected carrier that must be programmed into the cellular telephone unit for its activation, to the cellular telephone.

* * * * *